(12) United States Patent
Cai et al.

(10) Patent No.: US 8,098,601 B2
(45) Date of Patent: *Jan. 17, 2012

(54) SLOW ADAPTATION OF MODULATION AND CODING FOR PACKET TRANSMISSION

(75) Inventors: Zhijun Cai, Euless, TX (US); James E. Womack, Bedford, TX (US); Wei Wu, Coppell, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 1255 days.

This patent is subject to a terminal disclaimer.

(21) Appl. No.: 11/690,615

(22) Filed: Mar. 23, 2007

(65) Prior Publication Data

US 2008/0232301 A1    Sep. 25, 2008

(51) Int. Cl.
*H04B 1/56* (2006.01)

(52) U.S. Cl. ........................................ 370/276

(58) Field of Classification Search .................. None
See application file for complete search history.

(56) References Cited

U.S. PATENT DOCUMENTS

| | | | | |
|---|---|---|---|---|
| 6,208,663 | B1 * | 3/2001 | Schramm et al. | 370/465 |
| 7,649,960 | B2 * | 1/2010 | Raghavan et al. | 375/295 |
| 7,848,287 | B2 * | 12/2010 | Diachina et al. | 370/329 |
| 2002/0105960 | A1 | 8/2002 | Das et al. | |
| 2002/0129249 | A1 | 9/2002 | Maillard et al. | |
| 2003/0021243 | A1 | 1/2003 | Hamalainen | |
| 2003/0063587 | A1 * | 4/2003 | Cho et al. | 370/335 |
| 2004/0022176 | A1 | 2/2004 | Hashimoto et al. | |
| 2004/0022177 | A1 | 2/2004 | Awad et al. | |
| 2004/0184398 | A1 | 9/2004 | Walton et al. | |
| 2005/0128935 | A1 * | 6/2005 | Tang et al. | 370/208 |
| 2005/0232183 | A1 | 10/2005 | Sartori et al. | |
| 2005/0255807 | A1 | 11/2005 | Araki et al. | |
| 2006/0023659 | A1 * | 2/2006 | Abedi | 370/328 |
| 2006/0268886 | A1 | 11/2006 | Sammour et al. | |
| 2007/0097887 | A1 * | 5/2007 | Kim et al. | 370/276 |
| 2009/0279512 | A1 * | 11/2009 | Fujishima et al. | 370/336 |

FOREIGN PATENT DOCUMENTS

| | | |
|---|---|---|
| EP | 1248405 A1 | 10/2002 |
| EP | 1 289 181 A1 | 3/2003 |
| EP | 1289181 A1 | 3/2003 |
| EP | 1432261 A1 | 6/2004 |
| EP | 1455547 A1 | 9/2004 |
| EP | 1533933 A2 | 5/2005 |

(Continued)

OTHER PUBLICATIONS

Schieder, Andreas, et al.; "Enhanced Voice Over IP Support in GPRS and EGPRS"; Wireless Communications and Networking Conference, 2000; IEEE 23-28, vol. 2; Sep. 2000; pp. 803-808.

(Continued)

*Primary Examiner* — Chi Pham
*Assistant Examiner* — Fan Ng
(74) *Attorney, Agent, or Firm* — Conley Rose, P.C.; J. Robert Brown, Jr.

(57) ABSTRACT

Systems and methods for performing MCS adaptation are provided. In some cases, the network performs MCS adaptation based on received NACKs. In other cases, the mobile station determines an MCS based on channel quality measurements, and feeds back the MCS adaptation decision to the network. In either case, NACK-only feedback may be implemented to reduce interference.

3 Claims, 11 Drawing Sheets

FOREIGN PATENT DOCUMENTS

| | | |
|---|---|---|
| EP | 1534039 A2 | 5/2005 |
| EP | 1734698 A1 | 12/2006 |
| GB | 2410152 A | 7/2005 |
| WO | 02067618 A1 | 8/2002 |
| WO | 03010979 A2 | 2/2003 |
| WO | 2004114549 A1 | 12/2004 |
| WO | 2005112355 A1 | 11/2005 |

OTHER PUBLICATIONS

Shiozaki, Akira, et al.; "A Hybrid ARQ Scheme with Adaptive Forward Error Correction for Satellite Communications"; IEEE Transactions on Communications; vol. 39, No. 4; Apr. 1, 1991; pp. 482-484.

EP Search and Examination Report; EP Application No. EP07106179; Dec. 6, 2007; 20 pgs.

Summons to Attend Oral Proceedings Pursuant to Rule 115(1)EPC; EP Patent Application No. 07106179.0; Sep. 8, 2009; 5 pgs.

Decision to Refuse a European Patent Application; EP Patent Application No. 07106179.0; Feb. 25, 2010; 12 pgs.

Provision of the Minutes in Accordance with Rule 124(4) EPC; EP Patent Applicartion No. 07106179.0; Feb. 25, 2010; 4 pgs.

EP Examination Report; EP Patent Application No. 07106179.0; Feb. 2, 2009; 5 pgs.

PCT International Search Report; PCT Application No. PCT/CA2008/000566; Jul. 24, 2008; 3 pgs.

PCT Written Opinion of the International Searching Authority; PCT Application No. PCT/CA2008/000566; Jul. 24, 2008; 4 pgs.

Second EP Examination Report; EP Application No. EP07106179.0; Aug. 21, 2008; 4 pgs.

Canadian Office Action; Application No. 2,681,149; Sep. 8, 2011; 3 pages.

* cited by examiner

SLOW ADAPTATION OF MODULATION AND CODING FOR PACKET TRANSMISSION

FIELD OF THE APPLICATION

The application relates to packet transmission such as real-time low rate transmission, over a wireless link.

BACKGROUND

HARQ (Hybrid Automatic Repeat reQuest) is widely used in the LTE (long term evolution) 3GPP TR 25.814. Multiple fast retransmissions can help packet reception especially for the UEs (user equipment) at locations with poor channel conditions. However, for a real-time low-rate service, such as VoIP (Voice over IP), the number of retransmissions is limited due to the delay budget and voice frame rate. In a fast fading environment, fast CQI (channel quality indication) feedback can be used by the UE to signal channel quality to the base station. The base station uses this information to perform fast AMC (adaptive modulation and coding) by selecting an MCS (modulation and coding scheme) for the particular UE. However, fast CQI is undesirable due to the significant uplink overhead caused by the possible large number of UEs for such services (e.g., VoIP UEs). An alternative to using fast AMC is to rely on retransmissions to compensate for the fast fading.

BRIEF DESCRIPTION OF THE DRAWINGS

Embodiments will now be described with reference to the attached drawings in which.

DETAILED DESCRIPTION OF THE EMBODIMENTS

Figure 1:
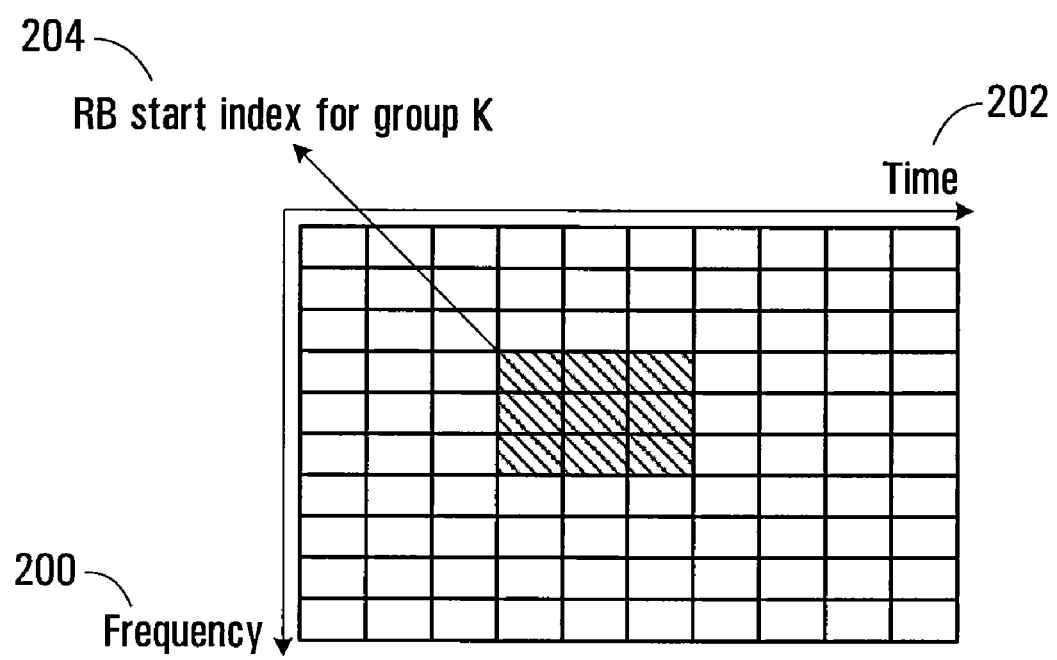
FIG. 1 is a diagram showing an example of a resource block index concept.

A broad aspect provides a method comprising: transmitting packets to a receiver using an MCS (modulation and coding scheme); receiving NACKs (negative acknowledgement) in respect of packets transmitted to the receiver; determining an updated MCS (modulation and encoding scheme) used to transmit subsequent packets to the receiver as a function of the received NACKs.

Another broad aspect provides a method comprising: a receiver receiving packets sent to the receiver over a wireless channel; the receiver making a channel quality measurement in respect of the wireless channel; the receiver making an MCS adaptation decision based on the channel quality measurement; the receiver feeding back the MCS adaptation decision in a slow rate manner.

Another broad aspect provides an arrangement of one or more wireless network components comprising: at least one antenna; a transmitter that transmits packets to a wireless device using an MCS (modulation and coding scheme); a receiver that receives adaptation decisions from the wireless device; an MCS adaptor that updates the MCS used to transmit subsequent packets to the wireless device based on the adaptation decisions received from the wireless device.

Another broad aspect provides arrangement of one or more wireless network components comprising: at least one antenna; a transmitter that transmits packets to a wireless device using an MCS (modulation and coding scheme); a receiver that receives NACKs (negative acknowledgements) in respect of packets sent to the wireless device; an MCS adaptor that updates the MCS used to transmit to the wireless device based on the NACKs received the wireless device.

Another broad aspect provides a wireless device comprising: at least one antenna; a receiver that receives packets; a channel quality measurement function that determines an average channel quality of a wireless channel over which the packets were received; an MCS (modulation and coding scheme) adaptor that makes an MCS adaptation decision as a function of the average channel quality of the wireless channel; a transmitter that transmits the MCS adaptation decision.

In addition, some of the methods described herein lend themselves to implementation in software stored on a computer readable medium. Further embodiments provide such a computer readable medium upon which is stored computer readable instructions to implement one or more of the methods.

Embodiments of the application provide for slow resource control used in a manner that "fits" the UE's geometry in order to limit the number of retransmissions. In the following, slow resource control for two different MCS assignment mechanisms will be described, namely independent MCS allocation, and groupwise MCS allocation.

In embodiments employing independent MCS, each UE's MCS is independently maintained in the UE and base station (such as an Enhanced-Node-B (ENB) (an LTE base station)). The User-plane transmission is independent for each UE.

In embodiments employing groupwise MCS allocation, UE groupings are defined, each UE grouping having a group property. In some embodiments, each group property is defined by a common MCS. The group size can be fixed or dynamic. In some embodiments, a group property is defined by common MCS in combination with a common RV (redundancy version). Two groups with the same MCS as reflected by the modulation and code rate, may employ coding with different coding properties. A simple example of a set of group property definitions is listed in Table 1:

TABLE 1

| | Group property | |
|---|---|---|
| | Modulation | Coding |
| Group 1 | QPSK | 0.5 |
| Group 2 | QPSK | 0.75 |
| Group 3 | 16QAM | 0.5 |
| Group 4 | 16QAM | 0.75 |

In this example, there are four groups. Each group has a respective group property defined by the modulation and coding. The actual definition of a set of possible group properties is implementation specific.

In the event a limited size of each group is imposed, there may be multiple groups that have the same group property. UEs with the same group property have similar average path loss (similar geometry) and QOS requirements (delay, jitter, BLER).

Initial MCS Assignment

Initial MCS assignment is the assignment of an MCS at the start of a communication. For independent MCS allocation, the network will first assign each UE to an initial MCS. For groupwise MCS allocation, the network will assign a group to the UE, the group having an associated MCS. In either case, the MCS might be selected to have properties that match the UE's current geometry and traffic properties.

In some embodiments, a UE requests the initial setting by reporting its current channel quality (for example average SNR condition) to the ENB. The ENB decides which MCS or Group is best suited to the UE and assigns the UE to that MCS/Group.

In some embodiments, the ENB assigns the UE to an initial MCS or an initial Group as a function of an uplink measurement. Note that the downlink MCS and uplink MCS may be different for a single UE. The initial assignment may be different for the DL and the UL (since the channel may be asymmetric). In one embodiment, the network may simply initially assign all UE's to the lowest modulation and coding requirement. The initial assignment can be signaled in any appropriate manner. In a specific example, layer 3 signaling via a RRC (radio resource control) procedure at the call setup stage is employed.

Resource Block Assignment

In some embodiments, an OFDM (orthogonal frequency division multiplexing) resource is used to define resource blocks. A resource block includes a set of sub-carriers offset in frequency dimension and a set of OFDM symbol durations in the time dimension. The locations of a given resource block (or a resource block set) can be arbitrarily defined. They may be distributed in time and/or frequency, or contiguous in time and/or frequency. A specific example of a resource block allocation is shown in FIG. 1. In FIG. 1, an OFDM resource consisting of OFDM sub-carriers in the frequency dimension 200 and OFDM symbols in the time dimension 202 is shown. A particular point in this two dimensional space can be used as a resource block allocation start index for a given group. An example of this is indicated at 204. Note that a resource block allocation can involve contiguous sub-carriers, or it can involve sub-carriers that are spread throughout an available OFDM bandwidth. A resource index can be used to refer to a particular resource block or resource block set.

More generally, resource blocks can be defined using any appropriate air interface technology, for example WCDMA (wideband code division multiple access) or MC-CDMA (multi-carrier code division multiple access) to name a few other specific examples.

In some embodiments, there are K resource blocks assigned per group. K can be constant across groups, or different across groups. In some embodiments, layer 3 or layer 2 signaling can be used to signal an assignment of resource blocks to a given group. This will also associate the group's group property (MCS and RV if used) with that resource assignment.

Notification for New Data transmission

The notification of a new packet transmission is performed through physical layer signaling. A new packet transmission is the first transmission of a given packet, as opposed to subsequent HARQ retransmissions. This signaling may be implemented using layer 1 signaling or implicitly derived by the persistent scheduling. If done by layer 1 signaling, a downlink L1 signaling portion (part of the overall layer 1 signaling) can be used to signal the notification. Specific examples of new packet notifications are given below.

In embodiments with independent MCS allocation, the Layer 1 signaling might for example include a UE identifier and a resource index, the resource index indicating where in the transmit resource the particular UE's content will be located. This might refer to a resource block or resource block set for example. In some embodiments, the resource index also implicitly indicates the MCS state. For example, if a set of resource blocks is collectively assigned a particular MCS, then assignment of a UE to one of those resource blocks implies that particular MCS is being used for that UE.

In embodiments with groupwise MCS allocation, the following is an example of information that might be transmitted for the purpose of notification of a new packet transmission:

1) Group ID: this implies: a) there will be User plane data for the group; b) the modulation and coding scheme;

2) Bitmap: this tells which UE(s) in the identified group will have data within the following data transmission; such a bitmap might for example include a respective bit for each UE in the group having the identified Group ID, with the bit set to a first state (one or zero) to indicate that data is included for the UE, and a second state (zero or one) to indicate that there is no data included for the UE;

3) The Resource Index: this identifies the transmission resources (for example which resource blocks) that are being allocated to the group. In some embodiments, the RB allocation for each group is fixed via the initial signaling, for example initial layer 3 signaling. Signaling the resource index for new packet notification using L1 signaling need not be performed in such instances.

NACK-Only Feedback

The Rel 6 HSDPA retransmission mechanism 3GPP TS 25.321 employs an ACK/NACK (acknowledgement/negative acknowledgement) based feedback system which is expected to cause large amounts of feedback for the VoIP. In such a system, each UE signals an ACK or a NACK for each transmission it receives to signal success or failure. In order to reduce feedback, a NACK-based feedback mechanism is provided in which the UE transmits a NACK when a received packet is in error and transmits nothing when the received packet is decoded correctly. This reduces uplink interference significantly when compared with the ACK/NACK based system.

In some embodiments, a simple ON/OFF keyed scheme on the reverse link can be applied assuming the UE has DTX (discontinuous transmission) capability. More specifically, in a UE feedback channel, a signal that uses some amount of energy (might represent a logical +1 or a −1 for example) is used to indicate NACK, and no energy is transmitted otherwise.

Figure 2:
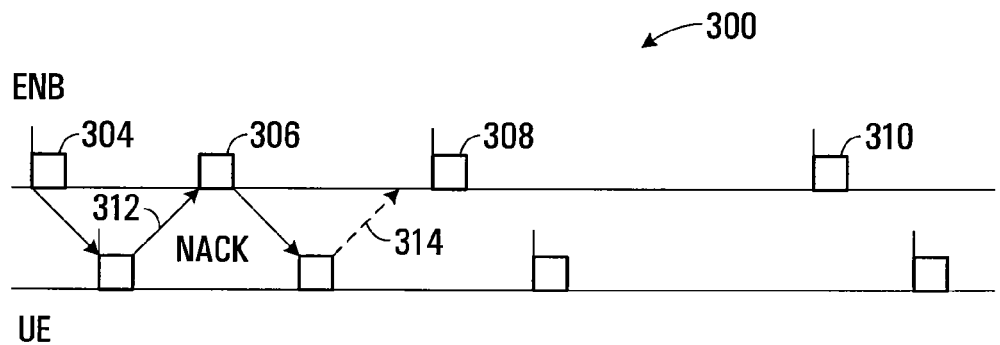
FIG. 2 is a diagram showing an example of NACK-only feedback.

An example of NACK-only feedback is shown in FIG. 2. A set of first packet transmissions is indicated at 304,308,310. It is assumed that packet 304 is not received correctly and as such the UE transmits a NACK 312. Packet 306 is a re-transmission that is then properly received by the UE. The dotted lines at 314 are representative of the fact that nothing is transmitted when a packet is properly received.

Figure 3:
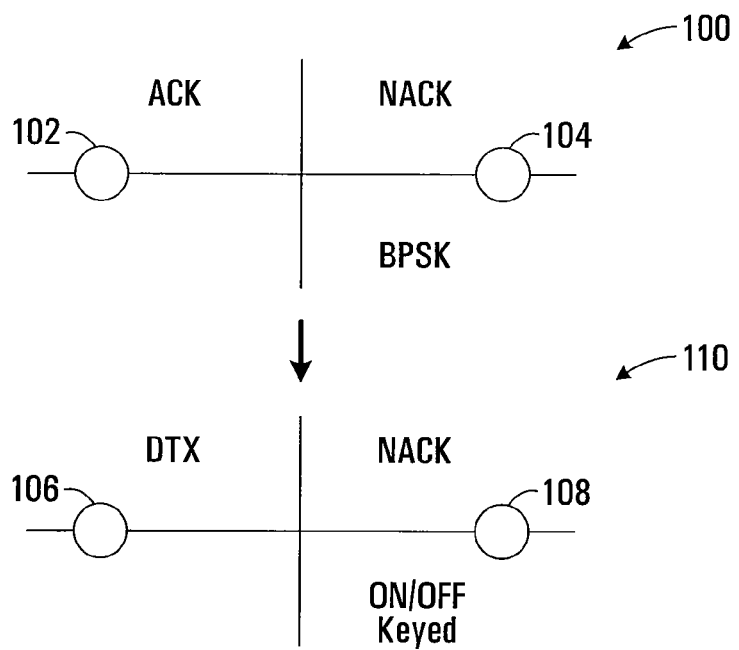
FIG. 3 contains signal diagrams for conventional ACK/NACK feedback and NACK-only feedback.

In some embodiments, to maintain a similar level of reliability as systems with ACK/NACK, the power used to transmit the NACK bits is increased, for example doubled. See for example FIG. 3 which shows a signal design for NACK-only feedback. Conventional ACK/NACK feedback is indicated at 100, this including a first signal 102 for ACK, and a second signal 104 for NACK. NACK-only feedback is indicated at 110. This includes DTX 106 (i.e. transmit nothing) for ACK and signal for NACK 108. In this example, the power of the NACK in the NACK-only feedback 110 is double that in the ACK/NACK feedback with the result that the distance in signal space between the ACK and the NACK in ACK/NACK signal design 100 is the same as the distance between the DTX and the NACK for the NACK-only signal design 110, thereby ensuring the same reliability. The ENB looks for the NACK feedback transmission from a given UE at a predetermined time. If the ENB does not detect enough energy to conclude a valid NACK transmission was received, it is assumed no NACK was transmitted, and that the UE correctly received the packet. If the ENB does detect enough energy to conclude a NACK was transmitted, then the ENB will schedule the packet retransmissions.

Figure 4:
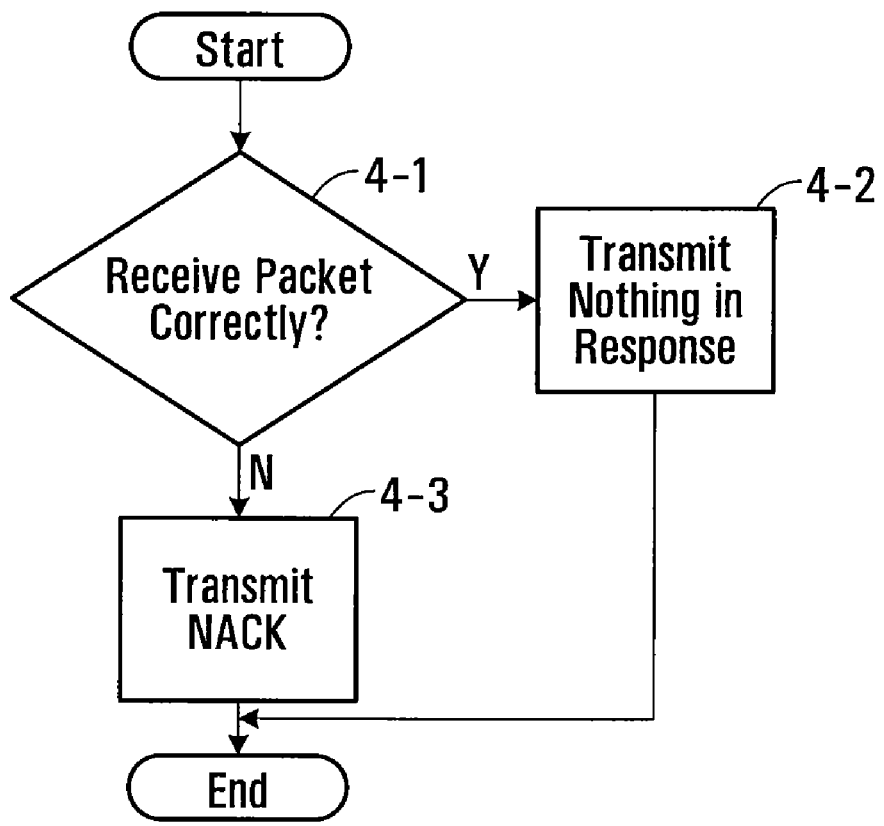
FIG. 4 is a flowchart of a method of performing NACK-only feedback.

A flowchart of an example implementation of NACK-only feedback is shown in FIG. 4. If a packet is received correctly, yes path step 4-1, then nothing is transmitted in response, step 4-2. If a packet is received incorrectly, no path step 4-2, then a NACK is transmitted at step 4-3.

Slow Adaptive MCS Change

Due to the UE's mobility capability, the UE's geometry may change with respect to time. In some embodiments, slow adaptive MCS/grouping is applied for voice UEs. The following are two examples of how this can be applied. Adaptation is "slow" in the sense that no attempt to track a fast-fading channel is made. Tracking a fast-fading channel might for example require channel estimation every 2 ms. Rather, the UE tracks the average channel condition over a longer window, for example over a window of 400 ms or greater.

1) Network Assisted

In the network assisted adaptive MCS method, the network monitors the UE's NACKs. This might for example involve determining the NACK rate or similar quantity. Based on this, the network slowly changes the UE's assigned MCS/group.

Figure 5:
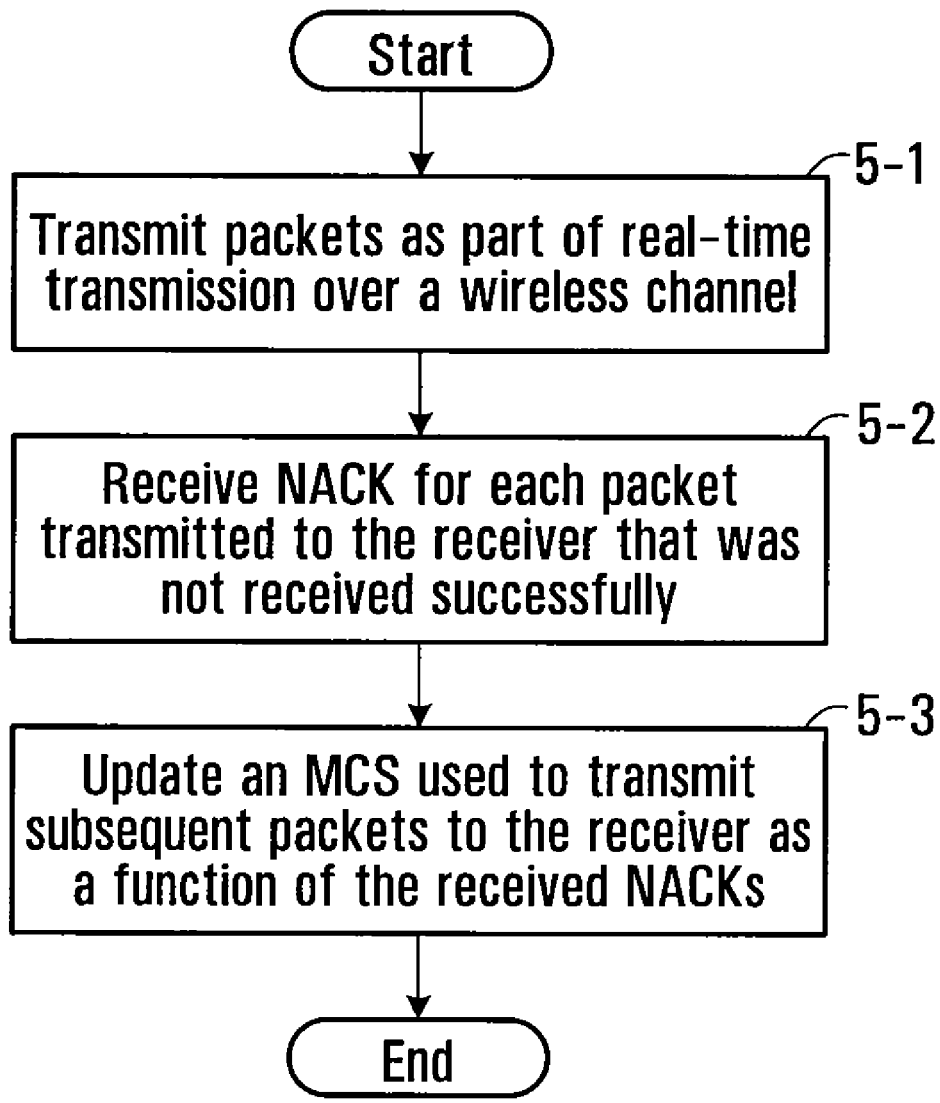
FIG. 5 is a flowchart of a method of performing MCS adaptation based on received NACKs.

A flowchart of a network assisted adaptive MCS method is shown in FIG. 5. At step 5-1, packets are transmitted as part of a real-time transmission over a wireless channel. At step 5-2, a NACK is received for each packet transmitted to the receiver that was not received successfully. At step 5-3, an MCS used to transmit subsequent packets to the receiver is updated as a function of the received NACKs.

For example, consider a UE that is initially assigned M=16 QAM, C=0.75. If, after a period of time, the network detects a NACK rate which is larger than a transition threshold, the network moves the UE to a more conservative MCS (for example, with M=QPSK, C=0.5). In the event the most conservative MCS is already being used, in some embodiments, the power used to transmit to that user is increased. The following is an example of a specific algorithm to implement this.

Define:
  N(j): the number of NACKs received from a particular UE j over a sliding window for accumulating the NACKs;
  Λ: size of the sliding window for accumulating NACKs;
  N(MAX): first threshold for moving a UE to a more conservative modulation and coding and/or power level—there can be a single threshold, or multiple thresholds; thresholds can be the same or different for different UEs;
  N(MIN): second threshold for moving a UE to a more aggressive modulation and coding and/or power level—there can be a single threshold, or multiple thresholds; thresholds can be the same or different for different UEs.

As an example of specific values for these parameters, sliding window=400 ms, N(MAX)=20; N(min)=3. However, the actual values used can be selected on an implementation specific basis.

Figure 6:
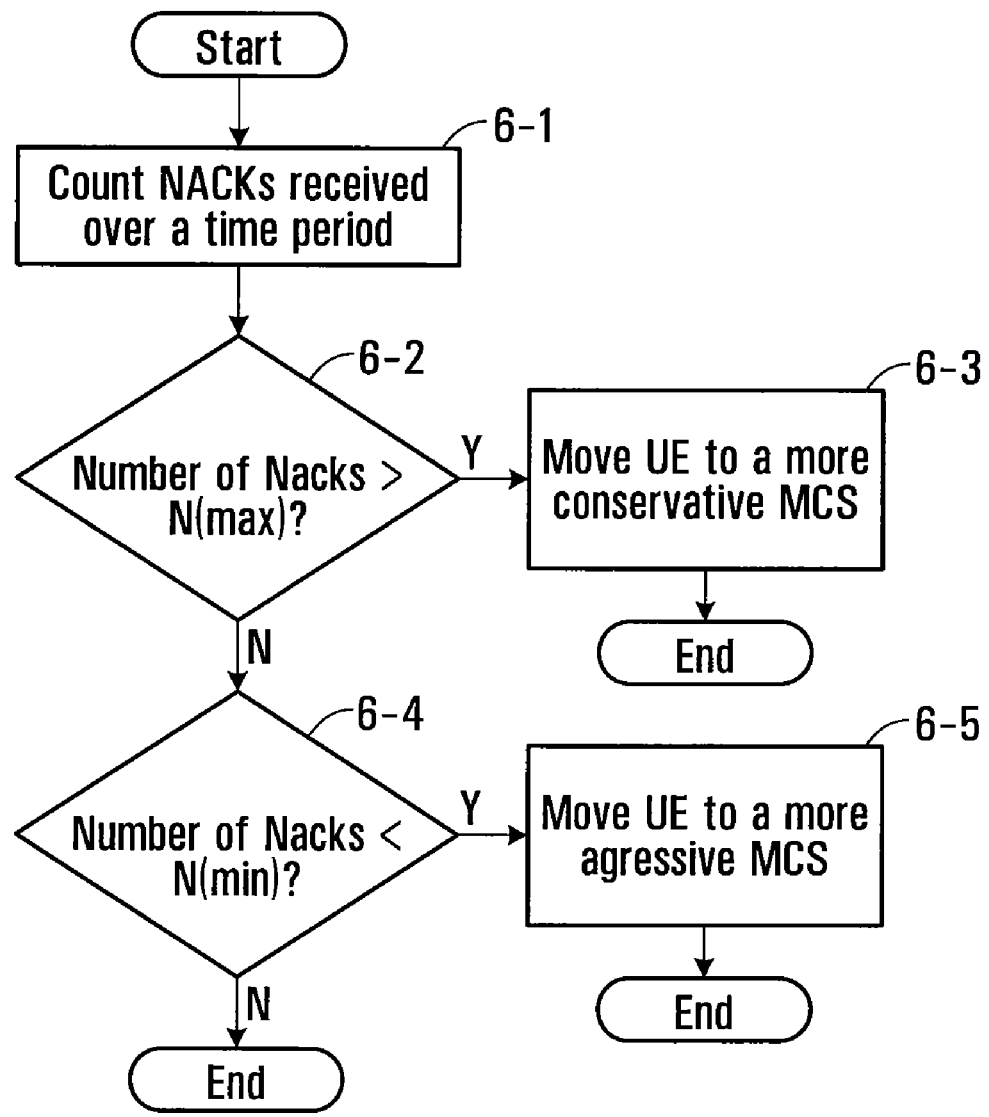
FIG. 6 is a flowchart of another method of performing MCS adaptation based on received NACKs.

The procedure in the ENB will now be described with reference to the flowchart of FIG. 6. To begin, the number of NACKs received from a certain UE, say UE j, is counted over a time period that might for example be a sliding window as described above, at step 6-1.

If in any duration Λ, N(j)>N(MAX) (yes path step 6-2), the UE is moved a more conservative MCS (step 6-3). In some embodiments, if no more conservative MCS is available, the power level may be increased. The assignment may also be based on RRM (radio resource management) considerations.

Similarly, if in any duration Λ, N(j)<N(MIN) (yes path step 6-4), the UE is assigned a more aggressive MCS (step 6-5). This may also be based on RRM considerations.

For groupwise MCS assignment, a change in the MCS will mean a change in the group to which the UE is assigned.

In network assisted adaptive MCS, there is no requirement for CQI feedback from the UE since the adaptive MCS approach does not use the CQI feedback to make adaptation decisions. Assuming no CQI feedback is sent, the UE's battery life can be extended.

The above approach to slow adaptive MCS change can be implemented in combination with the NACK-only feedback. However, it can also be used with any feedback mechanism that includes at least NACKs, for example systems employing conventional ACK/NACK feedback. The number of NACKs counted would be the same in either case.

In some embodiments, the network assisted adaptation further involves signaling to the receiver about the updated MCS. In other instances, the receiver may determine the updated MCS without such signaling, for example by using blind detection.

2) UE Assisted

In a UE assisted adaptive MCS method, the UE measures its own reception quality. If the UE determines the reception quality is sufficiently good, it requests to be moved to a more aggressive MCS using an uplink signaling. If the UE determines the reception quality is very poor, it requests to be moved to a more conservative MCS. Any appropriate signaling scheme can be employed. No CQI feedback need be implemented.

In some embodiments, the signaling for the request is Layer 1 signaling with 2 bit information to show the MCS change (2 bits to signal four states: up 1 level, down 1 level; maintain the same; unused). In some embodiments, the frequency of performing this signaling can be very slow, e.g., every 600 ms, and this can reduce the uplink overhead compared to the employment of full CQI transmission.

In some embodiments, in either case 1 (Network Assisted) or case 2 (UE Assisted), the network may choose not to move a UE to a more aggressive MCS/group. For example, if a particular UE has a high QoS requirement, then a transition to a more aggressive MCS/group may not be appropriate. The network might, for example, signal the decision to the UE by either RRC signaling or Layer 2 signaling or physical layer indications.

Figure 7:
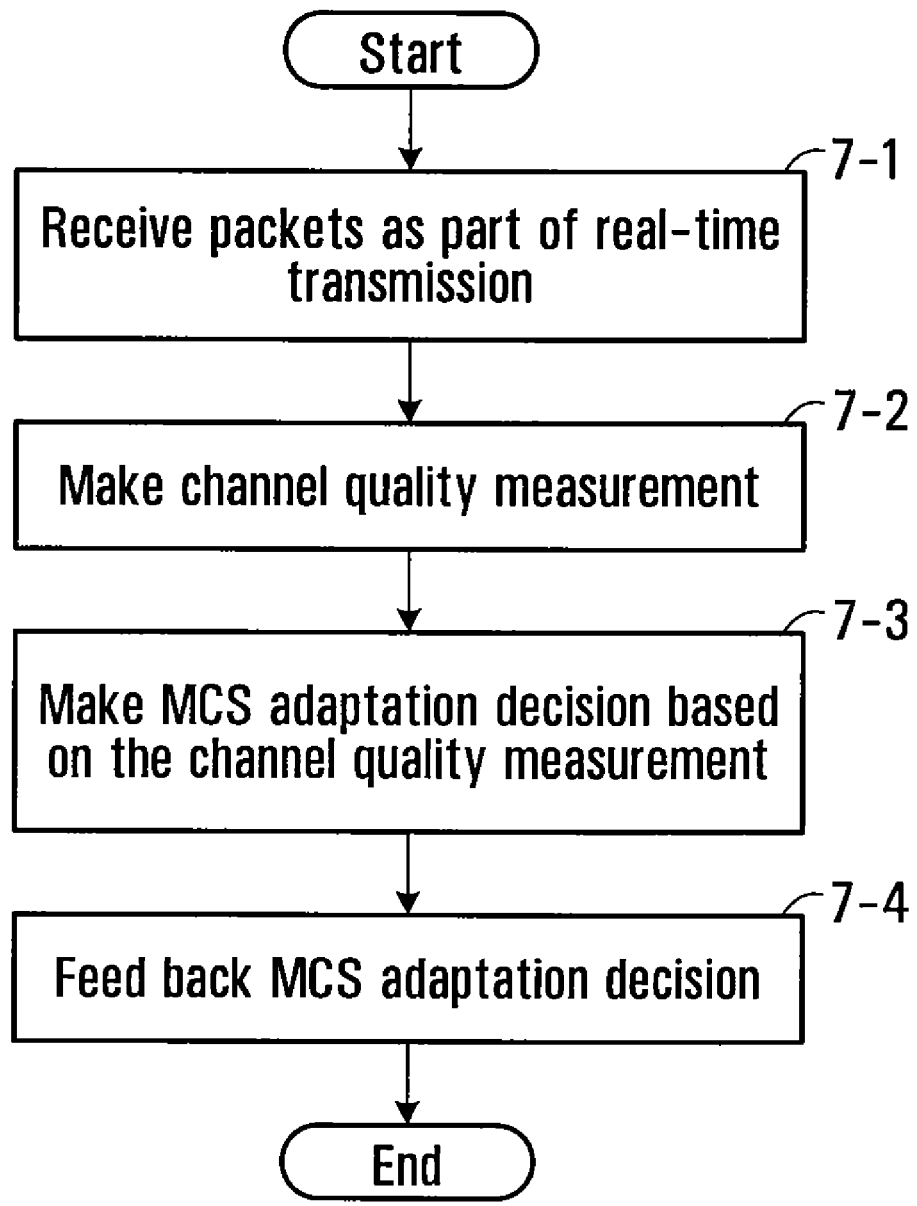
FIG. 7 is a flowchart of a method of performing UE assisted MCS adaptation.

A flowchart of a method of UE assisted MCS adaptation is shown in FIG. 7. The receiver receives a sequence of packets as part of a real-time transmission at step 7-1. At step 7-2, the receiver makes channel quality measurement in respect of a channel over which the packets were received. The receiver makes an MCS adaptation decision based on the channel quality measurement at step 7-3. Finally, the receiver feeds back to MCS adaptation decision at step 7-4.

While a particular application of the methods and systems described herein is to VoIP traffic, more generally, they can be applied to any real-time transmission over a wireless link such as streaming video, Instant messaging, real-time gaming, etc.

Figure 10:
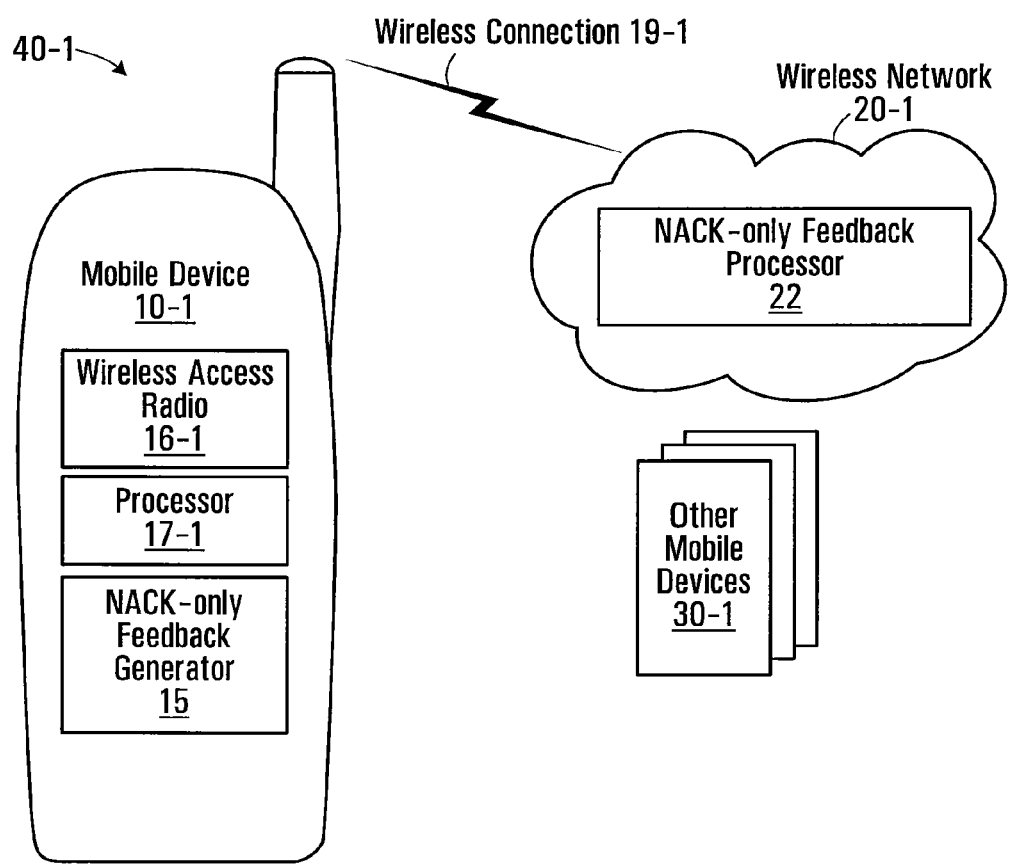
FIGS. 10, 11 and 12 contain block diagrams of receivers and network components that implement AMC adaptation and/or NACK-only feedback.

Referring now to FIG. 10, shown is a block diagram of an example communication system 40-1 for generating NACK-only feedback. The communication system 40-1 has a wireless network 20-1, a mobile device 10-1 (previously referred to as a UE), and other mobile devices 30-1; the communication system 40-1 may have other components, but they are not shown for sake of simplicity. For example, the mobile device and the network will each have transmitters and receivers, one or more antennas each. The mobile device 10-1 has a wireless access radio 16-1, a processor 17-1, and a NACK-only feedback generator. The mobile device 10-1 may have other components, but they are not shown for sake of simplicity. The other mobile devices 30-1 may each have components similar to those of the mobile device 10-1. Alternatively, some or all of the other mobile devices 30-1 may have different components than those of the mobile device 10-1. The wireless network 20-1 has a NACK-only feedback processor 22.

In operation, the mobile device 10-1 communicates with the wireless network 20-1 using its wireless access radio 16-1. The wireless communication is over a wireless connection 19-1 between the mobile device 10-1 and the wireless network 20-1. The other mobile devices 30-1 may similarly communicate with the wireless network 20-1 over respective wireless connections (not shown). The communication with the wireless network 20-1 might for example be telephony, or other forms of communication such as email. The NACK-only feedback generator 15 generates NACKs when packets are received incorrectly, and generates nothing when packets are received correctly. In the wireless network 20-1, the NACK-only feedback processor 22 processes the NACK-only feedback, and performs retransmissions as appropriate. Of course, a NACK that is transmitted may not necessarily be received as such—the effects of the channel may cause this to be interpreted as if nothing was transmitted; in addition, during a period that nothing is transmitted to indicate acceptable transmission, it is possible that the effects of the channel may cause this to be interpreted as if a NACK was transmitted.

In the illustrated example, the NACK-only feedback generator 15 is implemented as software and is executed on the processor 17-1. However, more generally, the NACK-only feedback generator 15 may be implemented as software, hardware, firmware, or any appropriate combination thereof. Similarly, the NACK-only feedback processor 22 may be implemented as software, hardware, firmware, or any appropriate combination thereof.

Figure 11:
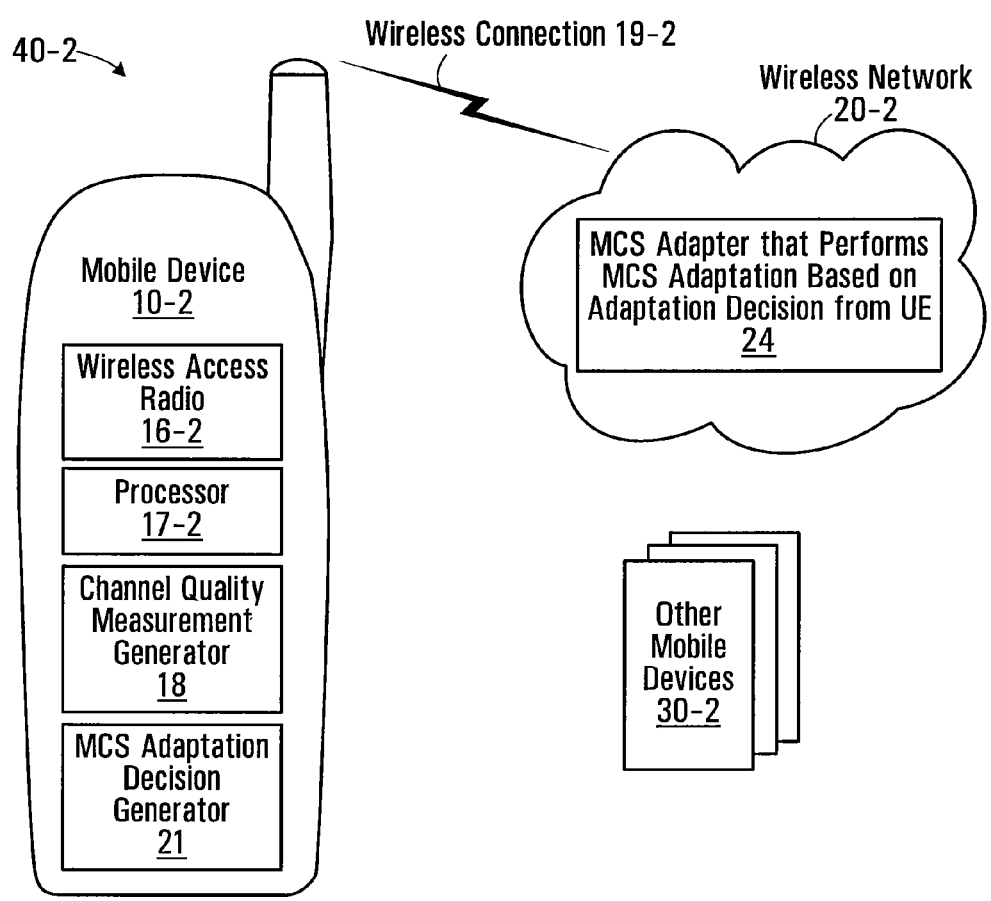

Referring now to FIG. 11, shown is a block diagram of an example communication system 40-2 for implemented UE assisted MCS adaptation. The communication system 40-2 has a wireless network 20-2, a mobile device 10-2 (previously referred to as a UE), and other mobile devices 30-2; the communication system 40-2 may have other components, but they are not shown for sake of simplicity. The mobile device 10-2 has a wireless access radio 16-2, a processor 17-2, a channel quality measurement generator 18, and an MCS adaptation decision generator 21. The mobile device 10-2 may have other components, but they are not shown for sake of simplicity. The other mobile devices 30-2 may each have components similar to those of the mobile device 10-2. Alternatively, some or all of the other mobile devices 30-2 may have different components than those of the mobile device 10-2. The wireless network 20-2 has an MCS adaptor 24 that performs MCS adaptation based on adaptation decisions received from the UE.

In operation, the mobile device 10-2 communicates with the wireless network 20-2 using its wireless access radio 16-2. The wireless communication is over a wireless connection 19-2 between the mobile device 10-2 and the wireless network 20-2. The other mobile devices 30-2 may similarly communicate with the wireless network 20-2 over respective wireless connections (not shown). The communication with the wireless network 20-2 might for example be telephony, or other forms of communication such as email. The channel quality measurement generator 18 determines a channel quality measurement in respect of the wireless channel over which packets are received. The MCS adaptation decision generator 21 takes this channel quality measurement and makes an MCS adaptation decision and feeds this back to the wireless network 20-2.

In some embodiments, the UE assisted MCS adaptation is implemented only for real-time services, with conventional CQI feedback implemented for other services.

In the illustrated example, the channel quality measurement generator 18 and the MCS adaptation decision generator 21 are implemented as software and is executed on the processor 17-2. However, more generally, the channel quality measurement generator 18 and the MCS adaptation decision generator 21 may be implemented as software, hardware, firmware, or any appropriate combination thereof. The MCS adaptor 24 may for example include software to process the adaptation decision and hardware to perform the actual modulation in accordance with the selected MCS. However, more generally, these functions may be implemented as software, hardware, firmware, or any appropriate combination thereof.

Figure 12:
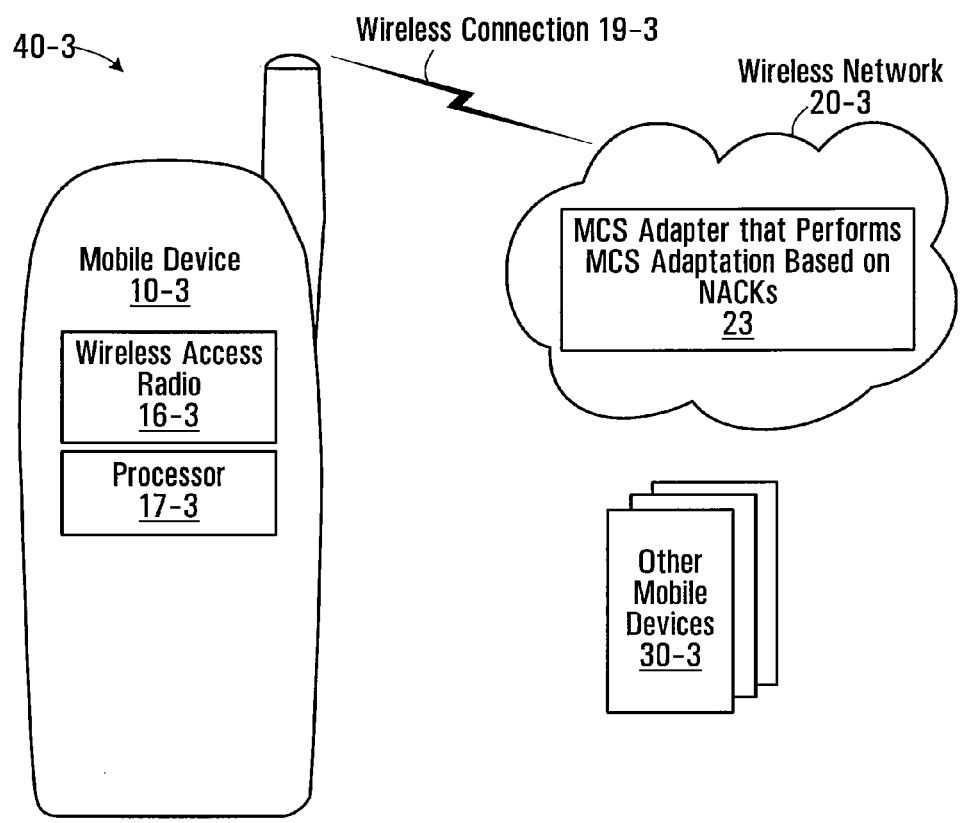

Referring now to FIG. 12, shown is a block diagram of an example communication system 40-3 for implementing network assisted MCS adaptation. The communication system 40-3 has a wireless network 20-3, a mobile device 10-3 (previously referred to as a UE), and other mobile devices 30-3; the communication system 40-3 may have other components, but they are not shown for sake of simplicity. The mobile device 10-3 has a wireless access radio 16-3, a processor 17-3. The mobile device 10-3 may have other components, but they are not shown for sake of simplicity. The other mobile devices 30-3 may each have components similar to those of the mobile device 10-3. Alternatively, some or all of the other mobile devices 30-3 may have different components than those of the mobile device 10-3. The wireless network 20-3 has an MCS adaptor 23 that performs MCS adaptation based on NACKs.

In operation, the mobile device 10-3 communicates with the wireless network 20-3 using its wireless access radio 16-3. The wireless communication is over a wireless connection 19-3 between the mobile device 10-3 and the wireless network 20-3. The other mobile devices 30-3 may similarly communicate with the wireless network 20-3 over respective wireless connections (not shown). The communication with the wireless network 20-3 might for example be telephony, or other forms of communication such as email. The mobile device 10-3 generates NACKs when packets are received incorrectly. The device may or not additionally generate an ACK in respect of each packet that is correctly received depending on whether or not NACK-only feedback is implemented. In the wireless network 20-1, the function 23 processes the received NACKs and makes MCS adaptation decisions based on the received NACKs.

In some embodiments, the MCS adaptation based on NACKS is implemented only for real-time services, with conventional CQI based MCS adaptation implemented for other services.

In the illustrated example, the MCS adaptor 23 includes software for processing the received NACKs, and hardware for performing modulation in accordance with the selected MCS. However, more generally, these functions may be implemented as software, hardware, firmware, or any appropriate combination thereof.

The wireless networks of FIGS. 10, 11, 12 are not shown with any specific components other than those specifically involved in implementing embodiments. The structure of the network will vary from one implementation to the next. However, it is to be understood that the wireless network would have any appropriate components suitable for a wired and/or wireless network. The components are implementation specific and may depend on the type of network.

Figure 8:
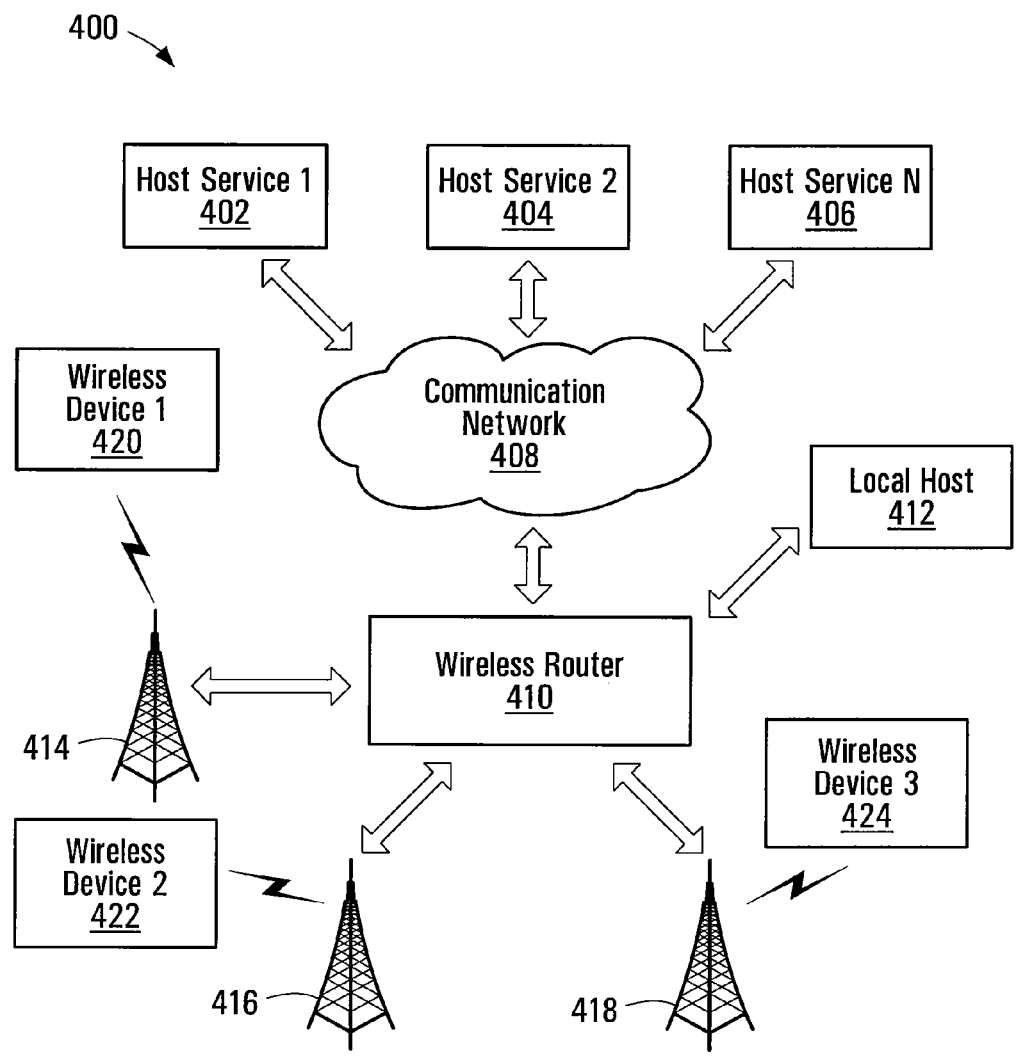
FIG. 8 is a block diagram of a network within which embodiments of the application may be implemented.

FIG. 8 is an exemplary environment in which a wireless communication system 400 in accordance with some embodiments may be practiced. Communications between illustrated network elements can be implemented using the above-summarized slow MCS adaptation methods. The exemplary wireless communication system 400 includes a plurality of host services (three shown, 402, 404, and 406), each of which may have a plurality of services such as, but not limited to, e-mail, calendar, Internet web browser, and other applications, available to their subscribers. In this particular example, the host services 402, 404, and 406 are typically configured as servers, each containing at least one processor, a storage means and each using a network interface over which communications with a communication network 408 such as the Internet can be effectuated. The host services 402, 404 and 406 send and receive messages over communications network 408 to and from wireless router system 410 allowing communication between the host services 402, 404, and 406 and the wireless router system 410.

The wireless router system 410 is connected to a plurality of wireless networks (three shown, 414, 416, and 418), each of which may support a plurality of mobile devices (one in each wireless network is shown, 420, 422, and 424). The wireless networks 414, 416, and 418 may be a cellular telephone network, such as a global system for mobile communication (GSM) network, or a code division multiple access (CDMA) network, a two-way paging network, a short range wireless network such as Bluetooth™, an IEEE 802.11 compliant network, and others alike. The mobile devices 420, 422, and 424 are devices compatible with the corresponding wireless network.

Mobile communications devices 420, 422 and 424 are two-way communication devices with advanced data communication capabilities having the capability to communicate with other mobile devices or computer systems, such as host services 402, 404, 406, through a network of transceiver stations, including wireless router 410 and communication network 408. The mobile communication devices 420, 422 and 424 may also have the capability to allow voice communication. Depending on the functionality provided, it may be referred to as a data messaging device, a two-way pager, a cellular telephone with data messaging capabilities, a wireless Internet appliance, or a data communication device (with or without telephony capabilities). The preceding list is not meant to be exhaustive; the embodiments described herein can be practiced with any type of mobile device, whether listed above or not. In the example shown in FIG. 8, mobile communications devices 420, 422 and 424 each contain a processor, a radio, an information storage means and at least one software module adapted to perform tasks. In some embodiments, mobile communications devices 420, 422 and 424 are capable of sending and receiving messages using the radio. Also in some embodiments, the at least one software module includes an event generator module, adapted to generate events, and a communications module, adapted to send and receive messages using the mobile communications device's radio.

Mobile communications devices are generally capable of communicating over multiple communication channels. For example, short message service (SMS) messages arrive over the voice communication channel, whereas email messages arrive over a data communication channel. As explained above, the mobile communications device 420 includes modules, software for example, which are adapted to perform various tasks when executed in mobile communications device 420's processor. In one embodiment, the mobile communications device 420 contains both a communication module and an event generator module. The communication module is adapted to execute in mobile communications device 420's processor and in cooperation with the mobile communications device 420's radio is capable of sending and receiving messages. The event generator module is also adapted to execute in mobile communications device 420's processor and is capable of generating events in one of two ways: user generated events and device generated events. User generated events include such things as the user of mobile communications device 420 opening a messaging application resident in mobile communications device 420, such as an email application, the user of mobile communications device 420 rolling a wheel input device, such as a thumbwheel, the user of mobile communications device 420 pressing a key on mobile communications device 420's keyboard, the user of mobile communications device 420 logging in to mobile communications device 420 or the user of mobile communications device 420 electing to maintain an active session by responding to a prompt from mobile communications device 420. Device generated events include such things as the expiry of a timer, mobile communications device 420 generating a ping message to keep a session alive with the network or mobile communications device 420 commencing a data session, such as a PDP context, with a network.

One of the primary purposes of host services 402, 404 and 406 is to process information received from other sources, such as mail servers (not shown) and mobile communications devices 420, 422, 424, and send the information on to the appropriate recipient, typically a different host service 402, 404, 406, mail server or mobile communications device 420, 422 or 424. Host services 402, 404 and 406 are configured to send and receive email messages and as such typically communicate with a mail server. Mail servers could include for example a Microsoft® Exchange® server, a Lotus® Domino® server, a Novell® GroupWise® server, an IMAP Server, a POP Server or a webmail server or any other mail server as would be understood by those in the art. The host services 402, 404 and 406 also contain a software module, which executes in their processor to achieve the desired sending and receiving of messages as well as the appropriate processing of information. In some embodiments the software module of each host service 402, 404, 406 is a messaging module, the messaging module is adapted to receive messages from at least one external mail server, send messages to mobile communications devices 420, 422, 424, receive messages from the same mobile communications devices and send messages to the at least one external mail server(s). The at least one external mail server(s) could also be at least one mobile data server(s) for example. The wireless router system 410 may also be directly connected to a host service, such as a local service 412, without the communication network 408. In another embodiment, it is possible for host services 402, 404 and 406 to communicate directly with mobile communications devices 420, 422 and 424. In this embodiment, host services 402, 404 and 406 must be capable of addressing communications to mobile communications devices 420, 422 and 424 without the aid of the wireless router system 410.

In the environment described in FIG. 8, messaging occurs between mobile communications devices 420, 422 and 424 and host services 402, 404 and 406. It is possible for mobile communications devices 420, 422 and 424 to send messages to and receive messages from host services 402, 404 and 406. As an example, when a message is received by any one of host services 402, 404, 406, the intended recipient, mobile communications devices 420, 422 and 424 is informed by the host service 402, 404 and 406 that a message has arrived which needs to be retrieved by way of an enable message. Host service 402, 404 and 406 may send a plurality of enable messages to mobile communications device 420, 422 and 424 or host service 402, 404 and 406 may choose to send one enable message until mobile communications device 420, 422 and 424 fetches the pending message(s). A fetch command is issued by the mobile communications device 420, 422 and 424 upon the generation of an event by an event generator after an enable message has been received and is sent to host service 402, 404 and 406. The generated event and the enable message are independent and neither one influences the occurrence or likelihood of the other. When host service 402, 404 and 406 receives a fetch command, host services 402, 404 and 406 will send the pending message or messages to mobile communications device 420, 422 and 424 which issued the fetch command. Both the enable messages and the fetch message may or may not contain message identifiers. A message identifier uniquely identifies a message for mobile communications devices 420, 422 and 424 and allows mobile communications devices 420, 422 and 424 to retrieve specific messages. The host service 402, 404, 406 may send all pending messages should multiple messages be pending for the mobile communications device 420, 422 and 424 which issued the fetch command.

Figure 9:
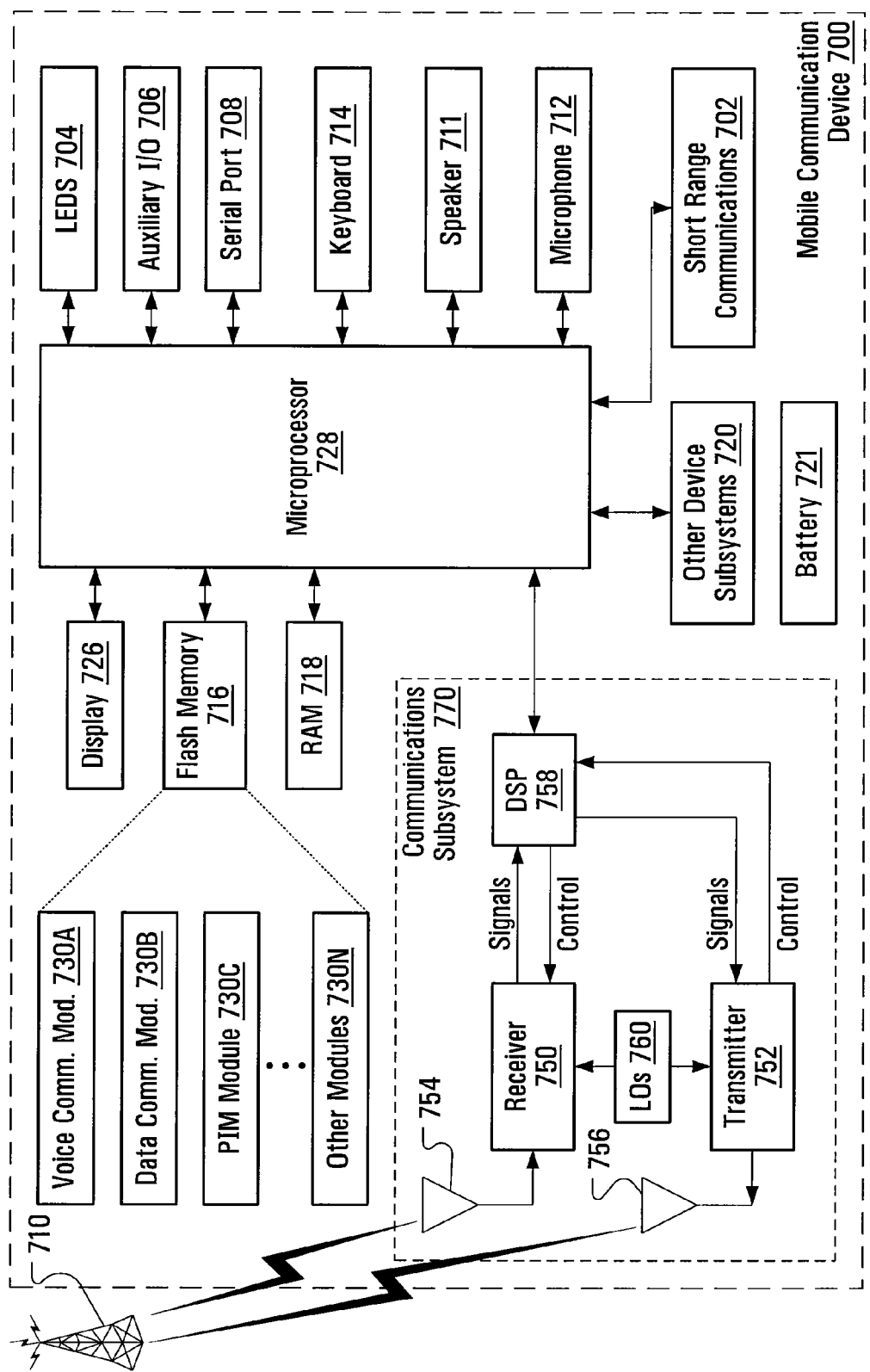
FIG. 9 is a block diagram of a UE within which embodiments of the application may be implemented.

Referring now to FIG. 9, shown is a block diagram of a mobile communication device 700 that may implement mobile device related methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 700.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

In FIG. 8, the wireless device and the base stations can cooperate to implement one or more the methods described herein. More generally, the network side may be implemented by one or more network components that may include base stations, base station controllers, wireless routers, or mobile switching centres to name a few example. The implementation particulars will depend on a given network configuration. In FIG. 9, microprocessor 728, RAM 718, communication sub-system (770), display 726, flash memory, voice module and data module can cooperate to implement one or more of the methods described herein. More generally, the implementation particulars will depend on a given wireless device configuration.

While the embodiments described are particularly applicable to real-time low rate packet transmissions, such as VoIP, it is to be understood they can be applied to other packet transmissions that may not necessarily be real-time or low rate, although the efficiencies realized with real-time low-rate applications may not necessarily be realized.

While the embodiments have been described in the context of downlink transmission from a base station to a UE, more generally, some embodiments may be applied for the transmission from a transmitter to a receiver. The transmitter and receiver may be the base station and UE respectively in the event the embodiments are to be applied to downlink transmission, or they may be the UE and the base station respectively in the event the embodiments are to be applied to uplink transmission.

Numerous modifications and variations of the present application are possible in light of the above teachings. It is therefore to be understood that within the scope of the appended claims, embodiments may be practiced otherwise than as specifically described herein.

We claim:

1. A method comprising:
  transmitting packets to a receiver using an MCS (modulation and coding scheme);
  receiving NACKs (negative acknowledgement) in respect of packets transmitted to the receiver;
  determining an updated MCS (modulation and encoding scheme) used to transmit subsequent packets to the receiver as a function of the received NACKs, wherein adapting an MCS (modulation and encoding scheme) used to transmit the sequence of packets as a function of the received negative acknowledgements comprises:
  counting a number of NACKs received over a time period, wherein updating an MCS (modulation and encoding scheme) used to transmit the sequence of packets as a function of the received negative acknowledgements further comprises:
  moving to a less aggressive MCS if the number of NACKs received over the time period exceeds a first threshold;
  moving to a more aggressive MCS if the number of NACKs received over the time period is less than a second threshold.

2. A method comprising:
  transmitting packets to a receiver using an MCS (modulation and coding scheme);
  receiving NACKs (negative acknowledgement) in respect of packets transmitted to the receiver;
  determining an updated MCS (modulation and encoding scheme) used to transmit subsequent packets to the receiver as a function of the received NACKs, wherein adapting an MCS (modulation and encoding scheme) used to transmit the sequence of packets as a function of the received negative acknowledgements comprises:
  counting a number of NACKs received over a time period, wherein the time period is at least 400 ms or comprises a sliding window.

3. A method comprising:
  a receiver receiving packets sent to the receiver over a wireless channel;
  the receiver making a channel quality measurement in respect of the wireless channel;
  the receiver making an MCS adaptation decision based on the channel quality measurement;

the receiver feeding back a first signal to indicate that a more aggressive MCS should be used when the channel quality measurement is above a first threshold; and the receiver feeding back a second signal to indicate that a less aggressive MCS should be used when the channel quality measurement is below a second threshold, wherein the receiver feeding back the MCS adaptation decision is performed at least every 400 ms.

* * * * *